United States Patent [19]
Keokoek

[11] Patent Number: 5,220,619
[45] Date of Patent: Jun. 15, 1993

[54] METHOD OF MATCHING A VARIABLE TWO-DIMENSIONAL IMAGE OF A KNOWN THREE-DIMENSIONAL OBJECT WITH A DESIRED TWO-DIMENSIONAL IMAGE OF THE OBJECT, AND DEVICE FOR CARRYING OUT THE METHOD

[75] Inventor: Robert M. Keokoek, Vuorela, Finland

[73] Assignee: U.S. Philips Corp., New York, N.Y.

[21] Appl. No.: 890,282

[22] Filed: May 26, 1992

Related U.S. Application Data

[63] Continuation of Ser. No. 604,733, Oct. 22, 1990, abandoned.

[30] Foreign Application Priority Data

Oct. 23, 1989 [NL] Netherlands .......................... 8902611

[51] Int. Cl.$^5$ .................................................. G06K 9/46
[52] U.S. Cl. .......................................... 382/16; 382/1
[58] Field of Search ................... 382/1, 16, 25, 28, 30, 382/34, 35, 44, 45, 46, 54

[56] References Cited

U.S. PATENT DOCUMENTS

4,658,428  4/1987  Bedros et al. ........................ 382/30

OTHER PUBLICATIONS

Systems Computers Controls, vol. 4, No. 5, 1973, pp. 8-16, Y. Tsuboi et al., "Positioning and Shape Detection Algorithms for an Industrial Robot".

IEEE Transactions on Pattern Analysis and Machine Intelligence, vol. PAMI-7 No. 3, May 1985, pp. 338-344, A. Goshtasby. "Template Matching in Rotated Images".

IEEE Transactions on Pattern Analysis and Machine Intelligence, vol. 10, No. 6 Nov. 1988, pp. 849-865, G. Borgefors, "Hierachical Chamfer Matching . . . ".

Primary Examiner—Jose L. Couso
Attorney, Agent, or Firm—David Schrieber

[57] ABSTRACT

The position of an object is determined by calculating the coordinates of the center of gravity of the overall image of the object supplied by an image sensor and the coordinates of the centers of gravity of, for example, quadrants converging in the center of gravity of the overall image on the basis of a binary silhouette of the object. These coordinates are compared with desired values in order to change subsequently the orientation of the sensor with respect to the object so that the difference between the coordinates to be calculated and the desired coordinates is minimized. The sensor is moved in orientation and/or position relative to the image sensor in step-wise fashion in order that the image approaches a reference image.

13 Claims, 4 Drawing Sheets

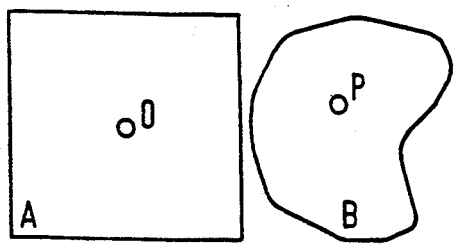
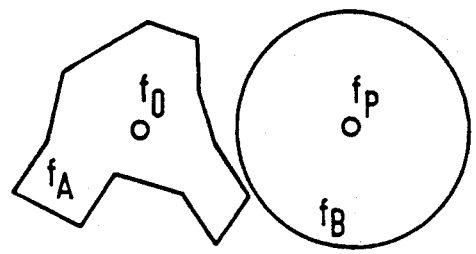
FIG. 3A    FIG. 3B
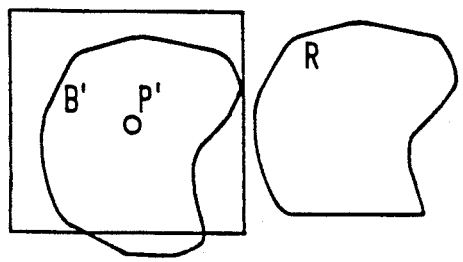
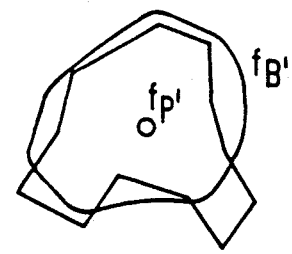
FIG. 4A    FIG. 4B
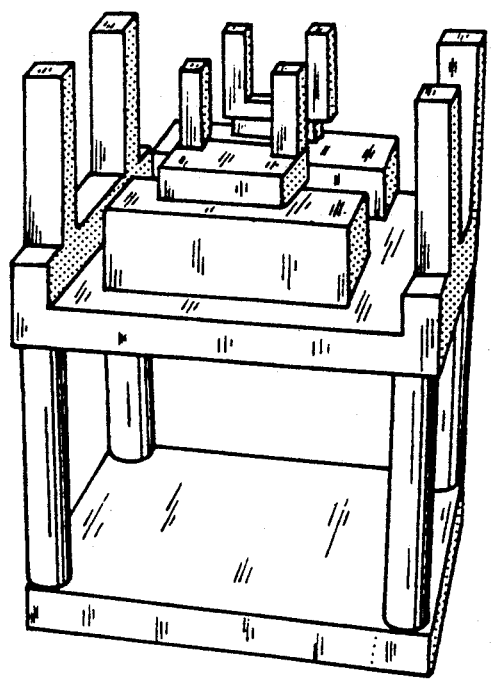
FIG. 5

| $\varphi_v$ \ $\varphi_h$ | -88 | -80 | -72 | -64 | -56 | -48 | -40 | -32 | -24 | -16 | 8 | 0 | 8 | 16 | 24 | 32 | 40 | 48 | 56 | 64 | 72 | 80 | 88 |
|---|---|---|---|---|---|---|---|---|---|---|---|---|---|---|---|---|---|---|---|---|---|---|---|
| -88 | • | • | 2 | 15 | 9 | 18 | 16 | 18 | 18 | 16 | 16 | 16 | 14 | 2 | 3 | 3 | 5 | 5 | 5 | 5 | 3 | 3 | 5 |
| -80 | • | • | 15 | 13 | 14 | 18 | 16 | 18 | 14 | 18 | 16 | 16 | 12 | 12 | 16 | 3 | 5 | 7 | 7 | 5 | 3 | 5 | 5 A |
| -72 | • | • | 2 | 15 | 9 | 17 | 14 | 16 | 16 | 16 | 16 | 16 | 16 | 16 | 5 | 5 | 7 | 7 | 7 | 14 | 12 | 5 | |
| -64 | • | • | 15 | 13 | 10 | 18 | 18 | 16 | 14 | 16 | 16 | [16] | 16 | 16 | 16 | 7 | 7 | 7 | 5 | 3 | 5 | 5 | |
| -56 | • | • | 15 | 13 | 9 | 18 | 5 | 14 | 11 | 16 | 16 | 16 | 16 | 16 | 5 | 5 | 7 | 7 | 5 | 3 | 3 | 5 | |
| -48 | • | • | 13 | 13 | 14 | 18 | 3 | 18 | 18 | 11 | 14 | 14 | 14 | 14 | 3 | 14 | 14 | 14 | 14 | 5 | 3 | 3 | 5 |
| -40 | • | • | 2 | 15 | 9 | 17 | 14 | 18 | 18 | 14 | 14 | 14 | 14 | 14 | 14 | 14 | 12 | 14 | 14 | 7 | 3 | 3 | 5 |
| -32 | • | • | 15 | 13 | 10 | 18 | 14 | 18 | 18 | 18 | 14 | [14] | 14 | 14 | 14 | 12 | 5 | 5 | 5 | 5 | 3 | 3 | 3 |
| -24 | • | • | 15 | 13 | 9 | 13 | 9 | 18 | 16 | 18 | 9 | 14 | 14 | 2 | 3 | 3 | 5 | 5 | 5 | 5 | 5 | 3 | 3 |
| -16 | • | • | 13 | 13 | 18 | 13 | 10 | 18 | 18 | [18] | 10 | [12] | 12 | 12 | 3 | 3 | 5 | 7 | 7 | 5 | 5 | 3 | 3 |
| -8 | • | • | 2 | 15 | 18 | 13 | 9 | 13 | 18 | [17] | 9 | [10] | 10 | 10 | 3 | 5 | 5 | 7 | 7 | 7 | 7 | 3 | 3 |
| 0 | • | • | 15 | [15] | 13 | 13 | 13 | [13] | 13 | [11] | [9] | | [1] | [3] | 3 | [5] | 7 | 7 | 7 | [7] | 7 | 3 | 3 |
| 8 | • | • | 15 | 15 | 2 | 11 | 13 | 13 | 11 | 11 | 9 | [2] | 2 | 2 | 5 | 5 | 7 | 7 | 7 | 7 | 7 | 3 | 3 |
| 16 | • | • | 4 | 4 | 4 | 4 | 13 | 11 | 11 | 4 | | [4] | 4 | 4 | 6 | 6 | 6 | 6 | 7 | 7 | 3 | 3 | • |
| 24 | • | • | 2 | 10 | 4 | 10 | 4 | 4 | 4 | 6 | 4 | 4 | 6 | 10 | 6 | 6 | 6 | 6 | 7 | 3 | 3 | • | |
| 32 | • | • | 4 | 4 | 6 | 6 | 6 | 6 | 6 | 6 | | [6] | 6 | 6 | 6 | 8 | 8 | 6 | 6 | 3 | 3 | 3 | • |
| 40 | • | • | 6 | 6 | 4 | 4 | 6 | 6 | 6 | 6 | 6 | 6 | 6 | 6 | 8 | 8 | 6 | 6 | 4 | 5 | 3 | 3 | • |
| 48 | • | • | 4 | 6 | 6 | 4 | 11 | 6 | 11 | 6 | 6 | 6 | 8 | 8 | 8 | 8 | 6 | 6 | 4 | 3 | 3 | 3 | • |
| 56 | • | • | 4 | 6 | 6 | 6 | 4 | 6 | 6 | 8 | 8 | 8 | 8 | 8 | 8 | 6 | 6 | 6 | 4 | 3 | 3 | 3 | • |
| 64 | • | • | 4 | 6 | 6 | 6 | 6 | 6 | 6 | 8 | 8 | [8] | 8 | 8 | 8 | 6 | 6 | 6 | 7 | 5 | 3 | 3 | • |
| 72 | • | • | 4 | 6 | 6 | 6 | 6 | 6 | 8 | 8 | 8 | 8 | 8 | 8 | 6 | 6 | 6 | 7 | 7 | 5 | 3 | • | |
| 80 | • | • | 6 | 6 | 6 | 6 | 6 | 6 | 6 | 8 | 8 | 8 | 8 | 8 | 6 | 6 | 6 | 7 | 7 | 7 | 7 | 3 | • |
| 88 | • | • | 6 | 6 | 6 | 6 | 8 | 8 | 6 | 6 | 6 | 8 | 8 | 8 | 6 | 6 | 6 | 7 | 7 | 7 | 7 | 5 | • |

FIG. 6

METHOD OF MATCHING A VARIABLE TWO-DIMENSIONAL IMAGE OF A KNOWN THREE-DIMENSIONAL OBJECT WITH A DESIRED TWO-DIMENSIONAL IMAGE OF THE OBJECT, AND DEVICE FOR CARRYING OUT THE METHOD

This application is a continuation of U.S. application Ser. No. 07/604,733, now abandoned, filed Oct. 22, 1990.

BACKGROUND OF THE INVENTION

The invention relates to a method of matching a variable two-dimensional image of a known three-dimensional object with a desired two-dimensional image of the object by step-wise changing the variable image in the case of non-correspondence between the images.

A method of this kind is known from the publication by Radu Horaud "New Methods for Matching 3-D Objects with Single Perspective Views", IEEE Transactions on Pattern analysis and Machine Intelligence, Vol. pami-9, No. 3, May 1987.

The invention also relates to a device for carrying out the method. According to the known method, a set of edges and corners representing a contour is used to match an image with different kinds of models. This method is used for determining spatial relationships between an object and a camera which is movable by means of a robot. According to the known method, small two-dimensional templates are matched with the actual image in order to extract positions of edges and corners. Subsequently, an investigation is started as to which object location could have produced this combination of corner and edge locations. Even though for two-dimensional object recognition the known method offers the advantage that the object location can still be found if the object is partly damaged or, if other objects are present in the image, parts of the object are masked by other objects, for the three-dimensional object recognition involving six degrees of freedom a number of problems are encountered when this method is used, so that this method is rejected for the latter application.

The "observation" angle and orientation of corners of the object are not known in advance. Because a perspective projection changes displayed corners with respect to the actual corners of the object, accurate and reliable determination of corner locations is intricate.

Corners and edges appear and disappear when the orientation of the object changes. For complex objects, for example, an object having a complex set of enclosed corners and edges such as an industrial tool used for assembly, the search process must examine an enormous amount of possibilities.

Projections of curved surfaces produce complex edges. Curved surfaces produce edges in images only due to the two-dimensional projection. The assumption of a simple image of edges in the image on physical edges on the object is not valid in this case.

Noise puzzles corner and edge detectors. Noise readily produces small variations which could be interpreted as corners. On the other hand actual corners could be neglected due to noise. This is due to the fact that the recognition process is only local, without surveying the overall image.

For example, when an image is out of focus due to large variations in the distance between object and the camera, projections of corners are rounded so that the corner detection process is impeded.

Finally, the projection may introduce fictitious corners. Notably the image of object parts situated at different distances from the camera may contain fictitious corners.

SUMMARY OF THE INVENTION

Among other things, it is an object of the invention to provide a method for solving the described three-dimensional problem.

To achieve this, a method of the kind set forth in accordance with the invention is characterized in that global features of the images and/or features of the modulo-2 subtraction of the images are used to determine a desirable, step-wise change of the variable image in order to obtain a new variable image.

The method in accordance with the invention strongly deviates from the known method. For input, use is made of global image features such as surfaces and centres of gravity. Because these features are only vaguely related to specific object parts, the object cannot be recognised in the sense that it is known how parts of the image relate to parts of a model. The output is formed by desirable changes of, for example, the positions of the camera with respect to the object. For a changed situation new images can be obtained as follows, depending on the intended application: using a camera which is moved by a robot in the case of robot positioning or using a simulation by means of a computer program capable of producing a perspective view of a configuration of an object, observed as if it were via a camera, on the basis of the geometrical description of the object, together with its positions and orientations, the camera position and orientation and a description of the camera optical system in the case of camera location calibration or object location measurement where physical movements are not allowed.

As regards the terminology used herein it is to be noted that in the description the term "location" corresponds to "position" plus "orientation" or "translation" plus "rotation". A "model" is to be understood to mean the data describing an object.

In the case of robot positioning, if the grip of the robot comprises a camera, or more generally an image sensor, the grip can be instructed to move to a location specified with respect to a given object. This task is useful when an object is approached so as to be gripped. In the case of camera location calibration, measurement of the relation between camera and object can be used to calibrate the camera location if the location of an object and its geometry are known. In the case of object location measurement, the position and rotation of a known object can be measured as from a known camera location.

The method in accordance with the invention starts with a spatial initial relation and step-wise calculates changes in order to optimise the matching of a variable image with a desirable image, or reference image, of the object in the desired location. It is assumed that the specified relative location has been reached when the variable image matches the desirable image.

In the case of robot positioning, the desirable image is the image of the object which is observed from the specified relative location. The variable image, or projection image, originates from the movable camera. In the case of camera location calibration and object location measurement, the desirable image is the image observed by the camera, the variable image being produced by said computer program which is capable of changing the virtual camera location or the virtual object location.

It is assumed that the two images match if their modulo-2 subtraction does not produce pixels of value 1 or if global features of the images correspond. If the two images deviate, an optimising program utilises their global features and/or features of their subtraction to find a relative camera-object movement which improves the correspondence of the images.

BRIEF DESCRIPTION OF THE DRAWING

The invention will be described in detail hereinafter with reference to the drawing; therein:

FIGS. 3a, b graphically show the location space and feature space for movement of the camera;

FIGS. 4a, b correspond to the FIGS. 3a, b, be it after movement of the camera;

FIG. 5 shows an industrial object;

FIG. 6 is a survey of the method for feature recognition for the industrial object shown in FIG. 5.

DETAILED DESCRIPTION OF THE PREFERRED EMBODIMENTS

Figure 1:
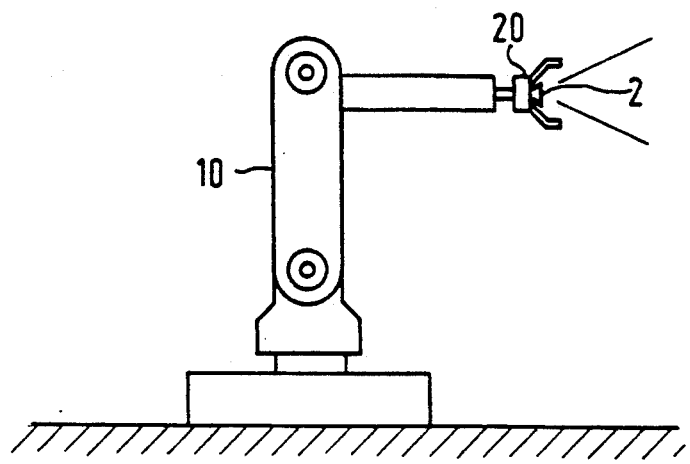
FIG. 1 diagrammatically shows a robot in simplified form.

A robot 10 as shown in FIG. 1 comprises a grip 20 with an image sensor 2, such as a camera, which is mounted in the grip 20.

For said optimising operation, a purely scalar minimisation algorithm can be used if the correspondence between two images can be expressed as a single number. A modulo-2 image subtraction produces the areas where the images differ. The total surface area of this subtraction can be used as input for the minimisation algorithm. The problem is thus reduced to the finding of a minimum in a six-dimensional environment of the difference in pixels for the six parameters. For the minimisation algorithm use can be made of the so-called simplex algorithm which is known from the publication by Marco S. Caceci et al "Fitting Curves to Data", Byte, May 1984, pages 340-460. A simplex is defined as the simplest geometric structure containing an N-dimensional volume. An N-dimensional simplex can be described by N+1 points, each point representing a specific relation between camera and object 1 for which the correspondence (number of different pixels) to the desired image can be evaluated. The simplex algorithm was implemented to optimise all six degrees of freedom simultaneously. The input evaluation value used was the number of different pixels between the variable and the desired image. This method offers a high accuracy, i.e. a sub-pixel accuracy, so that it is suitable for camera location calibration allowing for the use of application-specific objects. For other objects too many iterations are required; this is a direct result of the fact that a limited input is used. This is because the desired and the variable image must be compressed in one number only. Another aspect is that no geometric knowledge is used. Furthermore, minimisation methods are customarily evaluated on the basis of the number of attempts made to reach a minimum. However, when use is made of a camera 2 moved by a robot 10, an additional complication occurs in that it takes time to make a robot 10 move, notably when it is to change its direction. This implies that for the minimisation method the grip 20 of the robot 10 in which the camera 2 is mounted will not perform a smooth movement to reach the desired location.

Figure 2:
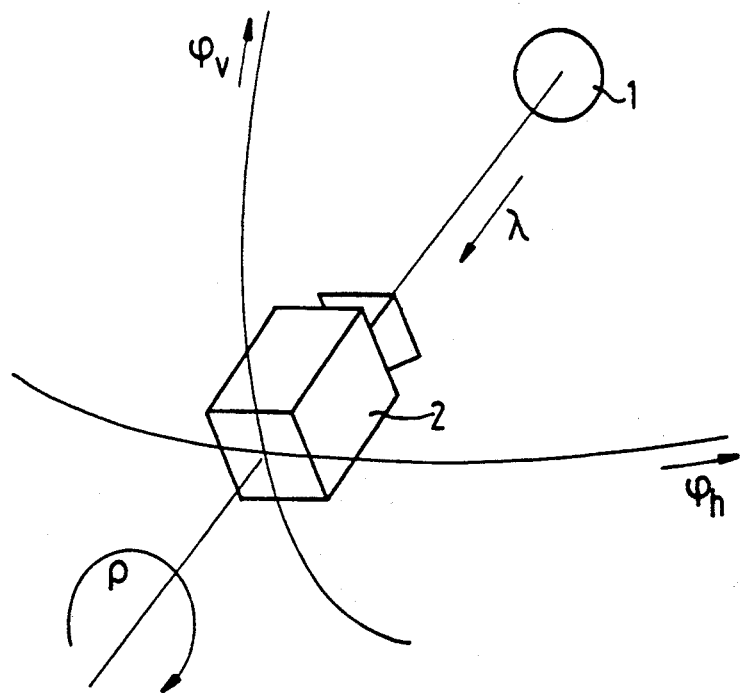
FIG. 2 shows a coordinate system for describing the spatial relationship between camera and object.

In FIG. 2 the origin of the fixed coordinate system is situated in the centre of the object 1. $\phi_h$ and $\phi_v$ denote the freedom of movement of the camera 2 in a horizontal and a vertical plane. Rotation of the camera 2 around the scanning direction is referred to as $\rho$, the distance between the object 1 and the camera 2 being denoted by the reference $\lambda$. Deviations from the optical axis of the camera 2 and the scanning direction towards the centre of the object 1 are referred to as $\theta_h$ and $\theta_v$. In FIG. 2, $\theta_h$ and $\theta_v$ are equal to zero and not shown.

Variations of $\phi_h$, $\phi_v$ and $\rho$ produce, substantially independently of the shape of the object 1, characteristic changes in the number of different pixels between the desired and the variable image. A strong relationship exists between the pick-up direction (scanning direction) of the camera 2 and the centre of gravity in its image. For small changes this is a substantially linear dependency. The area of an image is closely related to the squared inverse of the distance $\lambda$ between the camera 2 and the object 1. For small variations of $\lambda$, the deviation becomes zero. Changes in $\phi_h$, $\phi_v$ and $\rho$ produce a characteristic change of the surface area of the modulo-2 subtraction of the desired and the variable image, resembling the "absolute" function. Three samples which are not all situated on the same side of the minimum are required to determine the parameters. A suitable rough estimate of the minimum can then be immediately found.

The use of geometric knowledge, some examples of which have been given above and which are also referred to as global features, produces an increased convergence speed for the minimisation method. In the case of robot positioning a minimisation of $\phi_h$, $\phi_v$ and $\rho$ still necessitates very accurate positioning and irregular robot grip movement still occurs. As has already been stated, when a minimisation method is used, the entire image must be converted into a single value, implying an enormous loss of information which must be overcome by a trial and error strategy. The logical conclusion is to use more than one image feature. In that case, however, minimisation cannot be applied because minimisation of more than one number does not make sense. Hereinafter a method will be described which aims to match several features of the desired and the variable image.

A known object 1, having a given position and orientation (=location) causes a relevant occupation of the three-dimensional space. The camera 2 projects this on a two-dimensional surface. This image is mapped on a list of global features. If the total mapping function is unique for each point within a limited domain, an inverse function of the image exists within this area. The inverse can be found by inverting each of the three steps. These steps are known as geometric rules but are very difficult to invert explicitly. Like Fourier transformations, they combine information and distribute information, be it in a very complex and non-linear fashion. The inverse can be approximated by the explicit storage of the relations between samples in the location and feature space. In practice the sample density is limited by storage capacity, search time and time available for linking elements in the two spaces by means of a model program or by operation of the robot 10. An important improvement of this approximation of the inverse function can be achieved when it is considered that in this particular case movement in the location space is possible by means of a robot 10 or a model program and that small changes in the location space correspond to a small change of feature values.

Implications of these properties will be described in detail hereinafter by way of the two-dimensional spaces graphically shown in the FIGS. 3a, b and 4a, b. Points or areas in the location space (FIGS. 3a, 4a) will be denoted by capital characters such as A, B etc. Their corresponding features (in FIGS. 3b, 4b) are referred to as $f_A$, $f_B$, . . . etc. A distance $D(f_A, f_B)$ is defined in the feature space (FIGS. 3b, 4b). It expresses a degree of "proximity" which has a low value when feature values are similar. The desired relation between camera 2 and object 1 will be referred to as the origin of the space which is denoted by O. It is assumed that for the area A in FIG. 3a, being situated around the origin O, the location-to-feature image is sufficiently accurately known. For images having feature values in $f_A$ in FIG. 3b, the corresponding location in FIG. 3a is directly known. When $f_B$ describes an area in the feature space in FIG. 3b for which it can be readily detected whether points are situated therein or not, for example of the area in which the distance between the points $f_B$ is below a given threshold value, a corresponding area B can drawn around the location P in the location space of FIG. 3a. Thus, if an observation is made within $f_B$ in FIG. 3b, the desired strategy is, for example movement of the camera 2 along the vector PO in the location space in FIG. 3a. Thus, a part of the points in B in FIG. 3a will be situated within the area A, referred to as B' in FIG. 4a, for which recognition is ensured in FIG. 4b. Therefore, the area in which the desired location will be found is increased by R at the expense of a detection in the feature space of FIG. 3b and a movement in the location space in FIG. 3a to FIG. 4a. In this case the detection requires knowledge of an additional location-feature relation between P and $f_P$ in the FIGS. 3a, b. FIG. 4b shows the feature space after movement.

To be concrete, global feature recognition for two parameters will be described by way of example, i.e. $\phi_h$, $\phi_v$, the other location variables being optimised by geometric knowledge. The surfaces "A" and the X and Y coordinates of the centres of gravity $(C_{X,Y})$ of four quadrants having the origin in the overall centre of gravity were chosen as image features, so that:

$$\overline{A} = \begin{matrix} A^1/100 \\ A^2/100 \\ A^3/100 \\ A^4/100 \end{matrix} \quad \overline{C_x} = \begin{matrix} C_x^1 \\ C_x^2 \\ C_x^3 \\ C_x^4 \end{matrix} \quad \overline{C_y} = \begin{matrix} C_y^1 \\ C_y^2 \\ C_y^3 \\ C_y^4 \end{matrix}$$

$$f = (\overline{A}, \overline{C_x}, \overline{C_y})$$

where the indices 1-4 indicate the quadrant number. The four independently controlled location parameters ($\phi_h$, $\phi_v$, $\lambda$ and $\rho$) may still contain small errors, because their effect on the twelve features can be simply corrected. Therefore, the overall surface, the overall centre of gravity and the longest axial line can be used to scale, rotate and translate the four quadrants, so that the camera need not move and no other image is required.

$$A^{tot.} = \overline{A} \cdot (1111) \quad R = \text{angle of longest axial line.}$$

$$C_y^{tot.} = \frac{\overline{A}^T \cdot \overline{C_y}}{A^{tot.}} \quad C_x^{tot.} = \frac{\overline{A}^T \cdot \overline{C_x}}{A^{tot.}}$$

The distance calculation for features is defined as follows:

$$D(f_A, f_B) = \sum_i |f_{Ai} - f_{Bi}|$$

where i is a component index.

FIG. 6 is a survey of the behaviour of the feature recognition method for the industrial object shown in FIG. 5. Relations between the camera 2 and the object 1 have been simulated for $\phi_h$ and $\phi_v$ which extend from −88 to +88 degrees in intervals of eight degrees. Boxed numbers in FIG. 6 indicate positions whose global features are known in advance. The other positions exhibit a classification on the basis of the known reference point having the smallest feature distance. Subsequently, in accordance with the foregoing general explanation, for one position which is denoted by a given number the same movement is performed as would be required to move to the origin from a position bearing the same number but being boxed. Thus, from the position denoted by "a" and numbered 5, four steps to the left are made, in the same way as when from the boxed 5 a movement is made to the origin. Repeating this process, the origin is ultimately reached. This is not the case for the values of $\phi_h$ and $\phi_v$ which are denoted by heavy black points.

On the basis of the fact that with each image, that is to say variable image and desired image, there is associated a finite set of groups of parameters, $\phi_h$, $\phi_v$, $\rho$, $\lambda$, $\theta_h$ and $\theta_v$, for at least two parameters, for example $\phi_h$ and $\phi_v$, a number of global features, for example the surfaces and centres of gravities of four quadrants of two-dimensional images, for example black-white silhouettes, the origin of the four quadrants being the overall centre of gravity of the two-dimensional image, of variable images associated with a number of reference pairs of each time one of the parameters, for example ($\phi_h$, $\phi_v$) in the range (−88°−+88°) (−88°−+88°) are determined in discrete steps of 8°. It is known which step-wise changes are required to obtain the desired image from the variable image associated with a reference pair. For example in FIG. 6 the desired image is obtained from the reference pair ($\phi_v$, $\phi_h$)=(0°, +64°) by step-wise changing the variable $\phi_h$ from 64° to 0°. The variable images associated with all residual pairs, that is to say non-reference pairs, are compared with those associated with reference pairs and the residual pairs are classified as the respective reference pair of the variable image with which they correspond best, for example the residual pair ($\phi_h$, $\phi_v$)=(+48°, −80°) as the reference pair previously mentioned by way of example. Starting from a current variable image, in order to obtain a new variable image the step-wise changes are made which are necessary and known (see the exemplary values above) in order to obtain the desired image from the variable image added to the current variable image and associated with the reference pair which is the classification of the residual pair associated with the current image.

A strategy for determining useful positions of the known points is to plot a number thereof initially at exponentially increasing distances on the virtual X and Y axis in FIG. 6. Subsequently, a simulation indicates that additional points are required (in this case two), i.e. the boxed numbers 17 and 18 in addition to the boxed numbers 1-16 initially chosen.

The industrial object of FIG. 5 has a rotational symmetry of 180° so that the maximum size of the convergence areas is 90° (rotation in any arbitrary direction). In FIG. 6 the nearest diverging location is situated 80° from the origin. For comparison it is to be noted that according to the minimisation method known from prior art a convergence is obtained as from 24 degrees.

According to the global image feature recognition method the robot 10 moves quickly and smoothly to its destinations. Experimental results have demonstrated that it is very well possible to calculate relative locations from global features of multiple images without accurate recognition of object parts. In the case of robot positioning, visual feedbacks and deviations in the remainder of the control loop are reduced.

Figure 7:
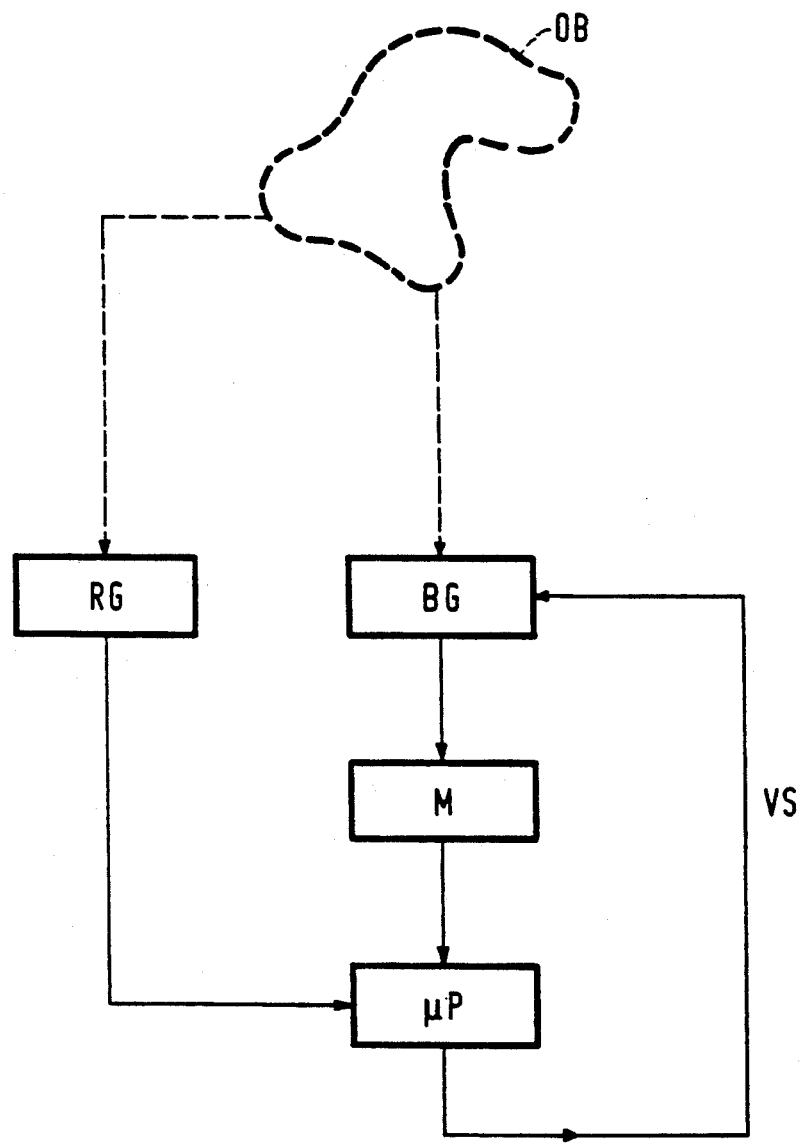
FIG. 7 shows a device in accordance with the invention.

FIG. 7 shows a device in accordance with the invention. An image generator BG (for example, a camera or a computer simulating an image) generates an image of an object OB. This image is stored in a memory M, preferably a RAM (Random Access Memory). Between BG and M there could be inserted an A/D converter, but an operational amplifier and a given threshold voltage are also suitable for digitizing the image. A reference image generator RG generates a reference image of the object OB: the desired two-dimensional image. A processor μP, being connected to RG and M, determines global features of the two images and of their difference image. On the bases thereof the processor μP supplies the image generator BG with an adjustment signal VS.

In one embodiment the reference image generator RG is suitable for receiving a reference image from the image generator BG. In that case the reference generator RG is formed, for example by a RAM which stores the reference image.

I claim:
1. A method of changing the location of a three-dimensional object relative to a point of view so that a projection image of the object from the point of view approaches conformance with a reference image, comprising the steps of:
   a) generating a projection image of the object for a present location of the object relative to the point of view;
   b) determining a scalar global parameter which is a measure of conformance of the projection image with the reference image, said determining including a step being selected from the group consisting of comparing areas in the projection and reference images, comparing centers of gravity in the projection and reference images and modulo-2 subtracting one of the projection and reference images from the other;
   c) determining a change in the location of the object relative to the point of view, from the present location to a new location which minimizes the scalar global parameter; and
   d) repeating step a) for the new location of the object relative to the point of view.

2. A method as claimed in claim 1, wherein the projection and reference images are binary silhouettes.

3. A method as claimed in claim 1, wherein the projection image is generated by sensing the object with an image sensor at the point of view.

4. A method as claimed in claim 1, wherein the projection image is generated by a computer which provides an image of the object as if it were sensed by an image sensor at the point of view.

5. A method as claimed in claim 4, wherein the image sensor is accommodated in a grip and further comprising the final step of gripping the object with the grip.

6. A method as claimed in claim 5, wherein a new projection image is generated for the new location of the object relative to the point of view after displacing the grip in space on the basis of the determined change in location of the object relative to the point of view.

7. A method as claimed in claim 1, further comprising the initial step of generating the reference image with an image sensor.

8. A method as claimed in claim 1, wherein the parameter is determined from the centers of gravity of four quadrants of the projection image, the origin of the four quadrants being situated in the overall center of gravity of the projection image.

9. A method as claimed in claim 1, wherein the change in location of the object relative to the point of view is determined using a linear multivariable algorithm which algorithm is used to determine a step-wise change of the projection image.

10. A method as claimed in claim 8, wherein the linear multivariable algorithm is a simplex algorithm where a simplex is the simplest geometric structure containing an N-dimensional volume.

11. A method as claimed in claim 9, where a finite set of groups of parameters is associated with each image, characterized in that for at least two parameters there are determined a number of reference pairs of each time one of the parameters, it being known which step-wise changes are required to obtain the reference image from the projection image associated with a reference pair, the projection images associated with all remaining pairs being compared with those associated with the reference pairs, the remaining pairs respectively being classified as the reference pair of the projection image with which they correspond best, and in order to obtain a new projection image, starting from a current projection image, the step-wise changes being executed which are necessary and known to obtain the reference image from the projection image added to the current projection image and associated with the reference pair which is the classification of the remaining pair associated with the current image.

12. A device for changing the location of a three-dimensional object relative to a point of view so that a projection image of the object from the point of view approaches conformance with a reference image, comprising:
   a) an image generator for generating a projection image of the object for a location of the object relative to the point of view;
   b) means for determining a scalar global parameter which is a measure of conformance of the projection image with the reference image, said determining including a step being selected from the group consisting of comparing areas in the projection and reference images, comparing centers of gravity in the projection and reference images and modulo-2 subtracting one of the projection and reference images from the other, and for forming an adjustment signal corresponding to a change in the location of the object relative to the point of view, from the present location to a new location, relative to the point of view, which minimizes the scalar global parameter; and c) means responsive to the adjustment signal for adjusting the location of the object relative to the point of view.

13. A device as claimed in claim 12, further comprising means for generating the reference image of the object.

* * * * *